US010445762B1

(12) United States Patent
Ho

(10) Patent No.: US 10,445,762 B1
(45) Date of Patent: Oct. 15, 2019

(54) ONLINE VIDEO SYSTEM, METHOD, AND MEDIUM FOR A/B TESTING OF VIDEO CONTENT

(71) Applicant: Yaoshiang Ho, Fremont, CA (US)

(72) Inventor: Yaoshiang Ho, Fremont, CA (US)

( * ) Notice: Subject to any disclaimer, the term of this patent is extended or adjusted under 35 U.S.C. 154(b) by 0 days.

(21) Appl. No.: 15/873,231

(22) Filed: Jan. 17, 2018

(51) Int. Cl.
*H04N 7/173* (2011.01)
*G06Q 30/02* (2012.01)
*H04N 21/8547* (2011.01)
*H04N 21/81* (2011.01)

(52) U.S. Cl.
CPC ..... *G06Q 30/0242* (2013.01); *G06Q 30/0277* (2013.01); *H04N 21/812* (2013.01); *H04N 21/8547* (2013.01)

(58) Field of Classification Search
CPC .......... H04N 21/23439; H04N 21/812; H04N 21/23424; H04N 21/4755; H04N 21/26258; H04N 21/25891; H04N 21/8455; H04N 21/854; H04N 21/8543; H04N 21/8586; H04N 21/4825
See application file for complete search history.

(56) References Cited

U.S. PATENT DOCUMENTS

| 7,411,590 | B1 | 8/2008 | Boyd et al. |
| 7,840,667 | B2 | 11/2010 | Weller et al. |
| 7,895,617 | B2 | 2/2011 | Pedlow |
| 8,069,125 | B2 | 11/2011 | Jung et al. |
| 8,140,376 | B2 | 3/2012 | Koonce et al. |
| 8,329,126 | B2 | 12/2012 | Freeman et al. |
| 8,645,504 | B2 | 2/2014 | McGowan |
| 8,712,831 | B2 | 4/2014 | Cline et al. |
| 8,813,154 | B1 | 8/2014 | Sivertsen et al. |
| 8,954,477 | B2 | 2/2015 | Agnoli et al. |
| 9,014,544 | B2 | 4/2015 | Wang et al. |
| 9,412,414 | B2 | 8/2016 | Wang et al. |
| 9,583,140 | B1* | 2/2017 | Rady ............... G11B 27/031 |
| 9,626,769 | B2 | 4/2017 | Tripathi et al. |
| 2003/0099459 | A1 | 5/2003 | Yanagita et al. |
| 2007/0100688 | A1 | 5/2007 | Book |
| 2007/0156479 | A1 | 7/2007 | Long |
| 2009/0313546 | A1* | 12/2009 | Katpelly ............ H04N 7/17318 715/723 |
| 2011/0016483 | A1 | 1/2011 | Opdycke |

(Continued)

*Primary Examiner* — Jason P Salce
(74) *Attorney, Agent, or Firm* — Carrie Stroup

(57) ABSTRACT

Video editor and an online video platform (OVP) computer systems, methods, and medium are provided for automatedly and randomly creating variations of a video, then uploading and market testing the favorability of each video version, such as for: A/B testing of an online commercial. Alternative video element combinations are selected by a user in a video editor application, saved in a data structure as separate video files, randomly combined into a full-length video via the OVP in response to a user activating a URL in a webpage, and then statistically analyzed for favorability, persuasiveness, etc. The video elements that are made into altered versions comprise: video clips, cards, overlays, and background music. Types of alterations comprise: permutations via switching the order of elements; split-testing by creating variations of scenes, cards, and/or background music for timecoded video segments; and dropping by omitting an element.

16 Claims, 13 Drawing Sheets

(56) References Cited

U.S. PATENT DOCUMENTS

| | | | |
|---|---|---|---|
| 2011/0307924 A1* | 12/2011 | Roberts | H04N 5/44543 |
| | | | 725/44 |
| 2011/0320287 A1* | 12/2011 | Holt | G06Q 30/00 |
| | | | 705/14.73 |
| 2012/0139940 A1* | 6/2012 | Chavanne | G06F 16/95 |
| | | | 345/629 |
| 2012/0170659 A1 | 7/2012 | Chaudhury et al. | |
| 2013/0204664 A1 | 8/2013 | Romagnolo et al. | |
| 2014/0040012 A1 | 2/2014 | Brooks et al. | |
| 2014/0137144 A1* | 5/2014 | Jarvenpaa | H04N 21/25891 |
| | | | 725/13 |
| 2014/0201010 A1 | 7/2014 | Chanda et al. | |
| 2014/0278747 A1 | 9/2014 | Gumm et al. | |
| 2015/0195566 A1 | 7/2015 | Hinz et al. | |
| 2015/0310753 A1 | 10/2015 | Faus | |
| 2016/0119397 A1 | 4/2016 | Johnson | |
| 2016/0125916 A1* | 5/2016 | McNally | G11B 27/034 |
| | | | 386/282 |
| 2016/0148055 A1 | 5/2016 | Zilberstein et al. | |
| 2016/0227277 A1 | 8/2016 | Schlesinger et al. | |
| 2017/0083608 A1 | 3/2017 | Ye et al. | |
| 2017/0155971 A1* | 6/2017 | Vaculin | H04N 21/812 |
| 2017/0193403 A1 | 7/2017 | Iscoe et al. | |
| 2017/0238037 A1* | 8/2017 | Grover | H04N 21/23418 |
| | | | 725/19 |

* cited by examiner

EXEMPLARY CODE IN DATA STRUCTURE©

```xml
<?xml version="1.0" encoding="UTF-8"?>
<VideoAB>
 <segments>

<video-segment type="split-test" timestart="0:00" timeend="0:05">
   <video filename="confused-man.mpeg"/>
   <video filename="confused-woman.mpeg"/>
  </video-segment>

<card-segment type="no-test" timestart="0:05" timeend="0:07">
   <card text="Are you looking for the right tool for your home?" fgcolor="white" bgcolor="black" fontsize="12" halign="center" valign="center"/>
  </card-segment>

<video-segment type="split-test" timestart="0:07" timeend="0:15">
   <video filename="person-using-tool-outdoors.mpeg"/>
   <video filename="person-using-tool-indoors.mpeg"/>
  </video-segment>

<overlay-segment timestart="0:07" timeend="0:15">
   <overlay text="Brand X is the right solution for you"/>
   <overlay text="Brand X is the best tool for the job"/>
  </overlay-segment>
 <segments>

<background-musics>
  <music-segment type="split-test" timestart="0:00" timeend="0:15">
   <music filename="yesterday-beatles.mp3">
   <music filename="One-U2.mp3">
  </music-segment>
 </background-musics>
</VideoAB>
```

FIG. 5

```
VideoAB™ OVP ALGORITHM©
                                Video Clips

Render (MasterFile) {
  Result = new blank video
          for each video-segment, overlay-segment, or card-segment in MasterFile.Segments {
              if (it's a video-segment) {
          if (video-segment.type equals no-test) {
                      assert result.length = video-segment.timestart
                      append the video contained within video-segment to Result
                  } else if (video-segment.type equals drop-test) {
                      assert result.length = video-segment.timestart
                      50% of the time: append video contained within video-segment to Result
                      50% of the time: do nothing
                  } else if (video-segment.type equals split-test)
                      assert result.length = video-segment.timestart
                      From all the videos contained within the video-segment…
                      randomly select one…
                      then append that video to the Result
                  } else if (video-segment.type equals permutation-test) {
                      assert result.length = card-segment.timestart
                      while (not all videos within video-segment have been appended) {
                          randomly select a video contained within video-segment…
                          that has not been selected yet…
                          and then append that video to Result
                      }
                  }
```

FIG. 7A

VideoAB™ OVP ALGORITHM© continued

Card Segments

```
} else if (it's a card-segment) {
  if (card-segment.type equals no-test) {
            assert result.length = card-segment.timestart
            render a video with the text from the card from the card-segment, append to Result
        } else if (card-segment.type equals drop-test) {
            assert result.length = video-segment.timestart
            50% of the time:
                render a video with the text from the card from the card-segment...
                then append to Result
            other 50% of the time:
                do nothing
        } else if (card-segment.type equals split-test)
            assert result.length = card-segment.timestart
            From all the cards contained within the card-segment...
            randomly select one...
            and then render a video with the text from it...
          and then append to Result
        } else if (card-segment.type equals permutation-test) {
            assert result.length = card-segment.timestart
            while (not all cards within card-segment have been appended) {
                randomly select a card contained within card-segment...
                that has not been selected yet...
                and then render a video with the text from the card and append to Result
        }
      }
```

FIG. 7B

VideoAB™ OVP ALGORITHM© continued

Overlay Segments

```
} else if (it's an overlay-segment) {
    if (overlay-segment.type equals no-test) {
            take the text from the overlay from the within overlay-segment...
            And then overlay it over the existing video within Result.
    } else if (overlay-segment.type equals drop-test) {
        50% of the time:
            take the text from the overlay from the within overlay-segment...
            and then overlay it over the existing video within Result.
        other 50% of the time:
            do nothing
    } else if (overlay-segment.type equals split-test)
        From all the overlays contained within the overlay-segment...
        randomly select one...
            and then take the text from it...
        and then overlay it over the existing video within Result.
    } else if (overlay-segment.type equals permutation-test) {
        assert result.length = card-segment.timestart
        while (not all overlays within overlay-segment have been overlayed) {
            randomly select an overlay contained within overlay-segment...
                that has not been selected yet...
                and then take the text from it...
            and then overlay it over the existing video within Result.
        }
    }
}
```

FIG. 7C

VideoAB™ OVP ALGORITHM© continued

Background Music Segments

```
for each music-segment in MasterFile.Background-Musics {
        if (music-segment.type equals no-test) {
            Mix the music contained within the Music-Segment into the video within Result
        } else if (music-segment.type equals drop-test) {
           50% of the time:
               mix the music contained within the Music-Segment into the video within Result
           50% of the time:
               do nothing
        } else if (music-segment.type equals split-test)
            From all the musics contained within the music-segment...
            randomly select one...
            then mix that music into the video within Result
        } else if (music-segment.type equals permutation-test) {
            while (not all musics within music-segment have been appended) {
                randomly select a music contained within music-segment...
                that has not been selected yet...
                then mix that music into the video within Result
            }
        }
    }
}
```

ONLINE VIDEO SYSTEM, METHOD, AND MEDIUM FOR A/B TESTING OF VIDEO CONTENT

FIELD

The present disclosure general relates to market testing of videos, and in particular to an online video service provider-platform and a video editor tool to automatedly generate and play on a webpage, app, or other video consumption platform, multiple variations of a video to assess which video version is most favored by a viewing audience.

COPYRIGHT NOTICE

A portion of the disclosure of this patent application document contains material that is subject to copyright protection. The copyright owner-inventor-assignee has no objection to the facsimile reproduction by anyone of the patent document or the patent disclosure, as it appears in the Patent and Trademark Office patent files or records, but otherwise reserves all copyright rights whatsoever. All copyrights disclosed herein are the property of their respective owners.

TRADEMARKS DISCLAIMER

The product names used in this document are for identification purposes only. All trademarks and registered trademarks are the property of their respective owners.

BACKGROUND

"A/B Video Testing" and "Multivariate Testing" are methods of comparing various versions of a video (e.g. an online advertisement), to statistically analyze viewer input about which version of the video is most favored by a viewer (e.g. a consumer).

Although there are A/B testing framework systems for creating and testing changes to the text within a website, there is currently no system to allow a user to easily change and test other variables within a video, such as background music, deleting or switching scenes, etc. For example, any change to a video requires generating an entirely new full-length video with the change, and uploading it to the webpage. It is thus very time consuming and expensive to generate and upload a video for each change that is required to be viewer tested.

There is therefore is a need in online video for a networked computer system and method to automatedly, and randomly, generate a statistical sample of all possible full-length video versions, and electronically transmit them for playback. And then for the automated collection and analysis of viewer data to determine which video version is most favored by a plurality of viewers. The automated collection and analysis of viewer data can also be used to determine a different favored video version for each specific segment (e.g. demographic) of viewers. The networked computer system requires a novel video editor and a novel online video provider comprising at least one server able to randomly create, transcode and electronically transmit versions of full-length videos from a data structure of video elements (e.g. video scenes, cards, overlay, background music, etc.).

SUMMARY

The present disclosure comprises a VideoAB™ video editor device, networked system, and non-transitory computer-readable storage medium, comprising a tool (e.g. software) to enable a video editor to create different versions of timecoded segments of a video, and to store the video variations segments and other video elements in a data structure. Different versions of a video comprise textual and non-textual alterations, such as changes in: background music and audio; cards (i.e. text between scenes); overlays (i.e. text atop of a scene); and/or deleted and/or switched scenes, etc.

The present disclosure further comprises a VideoAB™ online video system or server(s) or platform (OVP) with non-transitory computer-readable storage medium able to automatedly and randomly generate full-length videos from the stored video segments and elements. The VideoAB™ OVP downloads or streams a full-length video variation to a variety of types of video players, such as web browsers (e.g. Chrome™, Safari™, etc.), or native video players built into an operating system (Apple iOS™ built-in video player, Roku™ built-in video player, Microsoft Windows™ Media Player, etc Then the VideoAB™ OVP, or a third-party computing device, performs data collection of viewer activity and/or statistical analysis to determine which video is most favored by, or persuasive to, a plurality of viewers or a plurality of various market segments of viewers (e.g. a specific demographic by age, geographic location, education level, income level, etc.).

The full-length videos comprise alternative versions of at least one of: product and/or service commercials; scenes from television or movies; and political campaign and issue advertisements; and wherein identifying the preferred video comprises collecting viewer activity from the plurality of viewer devices, and determining via statistical analysis which video of the plurality of videos was most likely to persuade the viewers to act in a specific manner, and/or is most favored by the majority of the viewers.

The present disclosure further comprises a computing device (third party server, editor device, OVP) comprising a data structure that is used by the VideoAB™ OVP to randomly create the multiple versions of the video for download or streaming to a variety of video players. In an embodiment, the stored video files within the data structure are separated into files by video element type, and/or by timecoded segments comprising user assigned video elements, and at least one tool to permutate, drop, or split-test the video elements.

An aspect of the present disclosure comprises improved methods and computer systems for conducting A/B testing by providing a URL link to the VideoAB™ OVP to automatedly create and play a plurality of video variations on the webpage, as compared to creating, saving, and uploading one video at a time; and then to collect viewers' activity remotely to determine the most favored, or persuasive video version.

In another embodiment, a computer with the VideoAB™ Editor Tool installed on or accessible via a network conducts the following steps: 1) receives user input to select video elements for a video script, wherein there are different versions of each type of video element, and the type of video elements comprise: video clips; cards; overlays; and background music and/or audio; 2) receives user input to assign at least one video element and/or tool (e.g. permutation, split-testing, and dropping) to each of a plurality of time-coded segments of the video script; 3) generates and displays at least one version of at least one time-coded segment (e.g. one full-length video version, or a part thereof) for the user to preview on the editor; and 4) saves the assigned video elements for each timecoded segments in a data structure accessible by a video provider computer via a network connection (e.g. the VideoAB™ Online Video Platform).

Tools: Per step 3 supra, generating different combinations of video elements for the timecoded segments comprises selecting at least one version of a video clip, background music-audio, card, and/or overlay; and/or performing editing functions using tools, such as: permutation, dropping, and/or split-testing of video timecoded segments, or parts thereof. "Permutation" comprises changing of the order of video elements; "Split-Testing" comprises making alternative versions (V) of a video script with different combinations of video elements for one or more segments/timecodes; and "Dropping" comprises making alternative versions (V) of the video script by deleting one or more video elements and/or segments. The generating of different combination of video elements occurs on the computer of the VideoAB™ Editor Tool when being previewed by a user of the VideoAB Editor Tool, and/or primarily on the VideoAB™ OVP.

In an embodiment, the VideoAB™ OVP automatedly and randomly generates a plurality of full-length videos, the videos comprising a different random combination of video elements for at least one timecoded segment; then distributes, via a network, a full-length video to each of a plurality of viewer electronic computing devices; and receives viewing activity from the viewers' devices, via the network, for the plurality of full-length videos to identify a viewers' preferred full-length video from the plurality of videos.

In an embodiment, in response to a viewer clicking on a webpage or mobile application comprising a URL link, the VideoAB™ OVP randomly generates a full-length video from the different versions of each timecoded segment stored in the data structure, and transmits the full-length video via the network to the viewer's device. In an alternative embodiment, the VideoAB™ OVP randomly generates and pre-stores a plurality of full-length videos from the different versions of each timecoded segment stored in the data structure, and then transmits one of the full-length videos to a viewer's device in response to the viewer clicking on a webpage, or mobile application, URL link. In either embodiment, the URL link either directs a video player embedded within the webpage to the VideoAB™ online video platform, or launches a native video player, which downloads or streams video from said platform.

The foregoing has outlined some of the more pertinent features of the present invention. These features should be construed to be merely illustrative. Many other beneficial results can be attained by applying the disclosed invention in a different manner or by modifying the invention as will be described.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 5 illustrates exemplary XML code within a data structure for the VideoAB™ OVP to generate alternative versions of a full-length video for the commercial of Table 2.

FIGS. 7A-7D illustrate continuous XML code, or subroutines, stored in the data structure.

FIG. 7A illustrates XML code for VideoAB™ OVP to utilize different video clips with tools comprising dropping, split-testing, and permutation to randomly generate a plurality of video segments.

FIG. 7B illustrates XML code for VideoAB™ OVP to utilize different cards with tools comprising dropping, split-testing, and permutation.

FIG. 7C illustrates XML code for VideoAB™ OVP to utilize different overlay segments with tools comprising dropping, split-testing, and permutation.

FIG. 7D illustrates XML code for VideoAB™ OVP to utilize different background music segments with tools comprising dropping, split-testing, and permutation.

DETAILED DESCRIPTION

Figure 1:
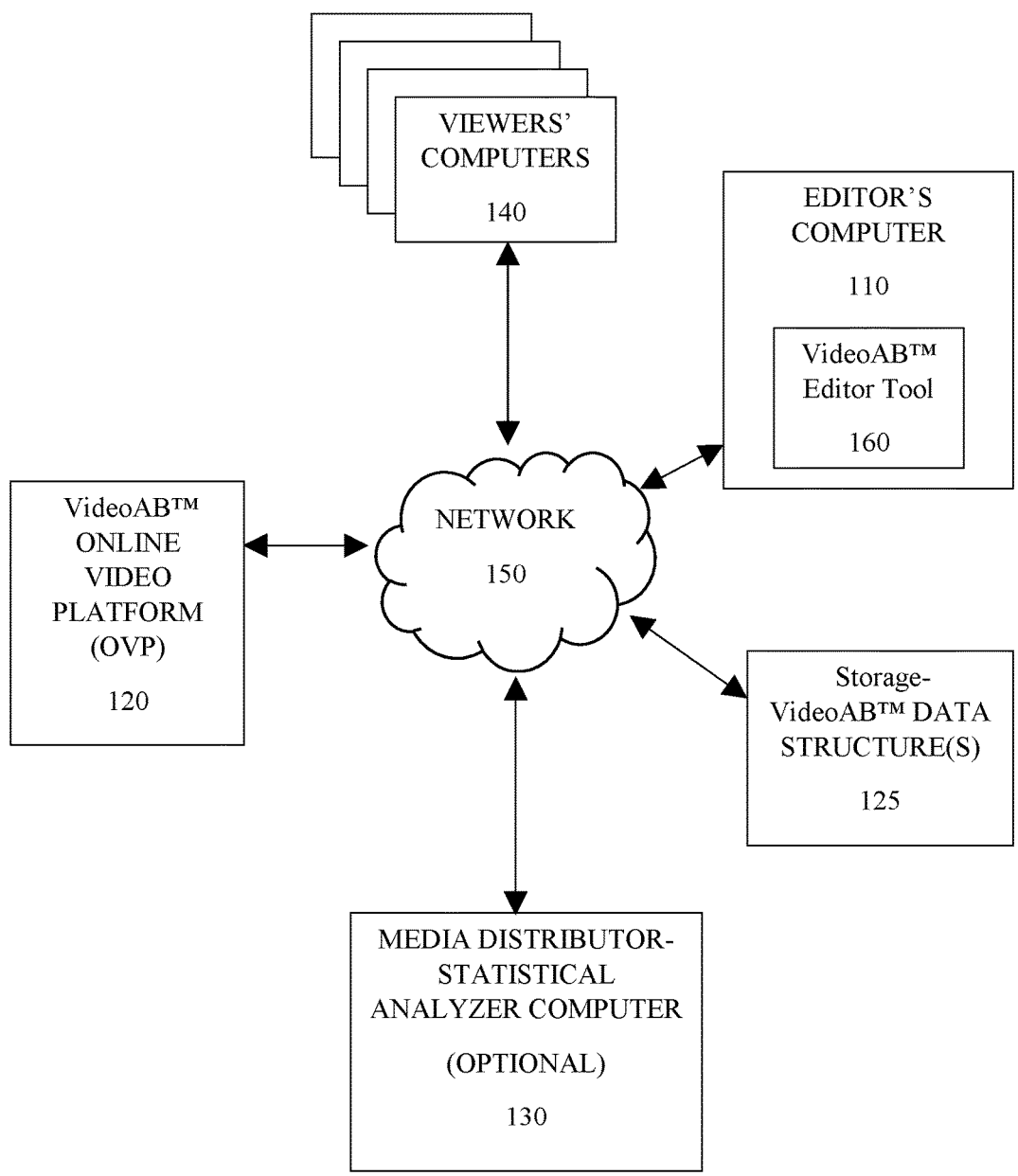
FIG. 1 is a block diagram of one embodiment of the networked computer system for editing, creating, distributing and playing a plurality of full-length video variations to each viewer device, and collecting and analyzing viewer feedback of which video variation is most favored by a plurality of viewers.

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Video Elements

One or more embodiments of the present disclosure comprise a computing device with computer readable storage medium for a content author or editor (e.g. a video producer) to draft a video script, and variations thereof, comprising at a minimum an outline of the video plot and sequence of events. Software tools for creating video scripts and to edit videos are well known in the art, but not one with the ability to easily create and store multiple variations of the same script as disclosed herein.

In one or more embodiments, a "video script" as disclosed herein is primarily composed of "video elements" arranged in a sequential order of "video segments" with timecodes to tell a story or convey a message to produce a "full-length video". "Video elements" in the present disclosure comprise: scenes, cards, overlays, and background music. "Scenes" are video clips with and without audio for short time segments. "Cards" are text that is exhibited between the video scenes. "Overlays" comprise text that is overlaid on top of a scene. And "background music" is audio files comprising melody, or melody and lyrics, that is synchronized with the full-length videos, or parts thereof. See Table 1.

TABLE 1

Video Elements=Scenes (X)+Cards (Y)+Overlay (Z)+ Background Music (W)

Scenes (X)=sequential scenes of X total number of video clips=scene 1+scene 2+scene X Cards (Y)=sequential cards of Y total number=card 1+card 2+card Y Overlay (Z)=overlay 1+overlay 2+overlay Z Background Music (W)=BM 1+BM 2+BM-W . . .

X, Y, Z, and W need not be of equal value

"Scenes" of "Video Clips" as used herein are also time sequenced digital videos, like motion pictures, that may further comprise synched audio. For example, a sequence of scenes may comprise: scene (A1) is a video of customers who may need a certain type of product; scene (A2) is the customers seem confused by various products to select from; scene (A3) is the customers choosing the marketer's product; and scene (A4) the customers are satisfied with the marketer's product. Scenes with synchronized audio comprise, for example, a video of someone mouthing the word "Hello", then there could also be synchronized audio of someone saying the word "Hello".

For example, a "full-length video" of the present disclosure is composed of—per Table 2 infra:

TABLE 2

| Timecodes | Sequential Scenes of Video Segments |
| --- | --- |
| Timecode 0:00 to 0:05 | A scene showing a confused customer, running for 5 seconds, with synchronized audio of a person saying "I am confused which tool to buy". |
| Timecode 0:05 to 0:07 | A card with the text "Are you looking for the right tool for your home?", which runs for 2 seconds. |
| Timecode 0:07 to 0:10 | A scene with a customer happily using a product with brand X, which runs for 2 seconds. A text overlays the scene with the text, "Brand X is the right solution for you.". |
| Timecode 0:00 to 0:10 | Throughout the entire 10 second video, there is background music playing of the song "Yesterday", by The Beatles. |

System Architecture

FIG. 1 is block diagram illustrating the system architecture for one exemplary embodiment comprising: a video editor's computer (also known as electronic computing device) 110; the VideoAB™ Online Video Platform (OVP) of the present disclosure comprising one or more computers, servers, etc. 120; an optional marketer's computer 130; a plurality of viewer's computers for viewing at least one full-length video 140; and a network 150.

The "viewer device", "viewer computer", and "viewer electronic computing device" 140 refers to the computing system with internet connectivity of the audience watching the full-length videos, from which the feedback is collected via the network 150. Types of devices comprise, by way of non-limiting examples: smartphones, tablets, laptops, desktops, smart televisions, portable media device, a set-top box, a video game console, etc.; and have the ability to play videos, and/or video streaming.

In an embodiment, network 150 is the Internet, such as for transmitting media files between computers 110 and 120. In other embodiments, the network may comprise other data communications networks, such as a distribution network for television content (e.g. videos of advertisements) between the marketer's computer 130 and the viewers' computers 110; and local area network ("LAN"), a wide area network ("WAN"), or an Intranet, or a network of networks.

The Video Editor's Computer 110 has installed thereon, or accessible via the network 150, the VideoAB™ Editor Tool application 160 of the present disclosure to create a plurality of versions of full-length videos, or timecoded segments thereof, based on source files comprising video clips, and in another embodiment further comprising at least one other video element (e.g. cards, overlays, audio-music).

The video files created using the VideoAB™ Editor Tool application 160 are stored in a database as one or more data structures 125, which may be co-located with the editor's computer 110, or on the VideoAB Online Video Platform (OVP) 120, or a separate server accessible to the computer 110 and the OVP 120 via the network 150. The video files comprise for at least one video element for each timecoded segment of a full-length video: at least one video clip; card; overlay; and/or audio or background music.

VideoAB Online Video Platform (OVP) 120 retrieves the video files from the data structure and further processes them for delivery to the plurality of viewer's computers 140. Processing comprises one or more tasks of: creation of full-length videos, indexing, transcoding (optional), and saving the video files in a video file format suitable for the viewer's type of device, browser, Internet speed, etc. to ensure quality video downloading and streaming. The processed video files may be stored back into server 125, or on OVP 120, and/or on media distributor server 130.

In response to the OVP 120 receiving viewer computer 140 input to watch a video of the present disclosure (or by the viewer computer 140 merely visiting a webpage that automatically launches the videos), the OVP 120 transmits via the network 150 a plurality of videos a least one video element for at least one timecoded segment. Different viewer computers 140 receive different versions of the full-length video.

Feedback: OVP 120, or another third-party system, such as a media distributor 130, collects via the network 150 the viewers' activity to conduct statistical analysis and determine which video version is most favored by the plurality of viewers. In an embodiment, the selected video is used in future advertising (e.g. online, broadcast television, digital signage, etc.).

As used herein, the term "a viewers' preferred or favored full-length video" refers to the video variation that the statistical analysis has determined is the most popular amongst all of the viewers (e.g. most likely to result in the viewers buying the product or service; and/or most likely to persuade the viewers to act in a specific manner, such as vote for a candidate or issue).

VideoAB™ Script Editor Tool

The present disclosure comprises a tool in the form of a video editor device with computer readable storage medium to facilitate a user designating different video elements for each time code, and saving in the same device or another (remote, local, cloud based, etc.) server for ingesting or uploading into an online video platform, such as disclosed herein for distribution and viewing via a computer network and market analysis of viewer activity.

At a minimum, the video editor device enables the editor to perform permutation, split-testing, and dropping functions to create multiple versions of a full-length video for previewing on the editor, and by using different combinations of video scenes, cards, overlays, and background music. "Permutation" is the changing of the order of video elements. For example, Scene 1+Scene 2+Scene 3 is permutated to Scene 2+Scene 1+Scene 3.

"Split-Testing" comprises making alternative versions (V) of a video script with different combinations of video elements for one or more segments/timecodes. For example, the first version (V1) of the first timecoded segment (e.g. time:00 seconds—30 seconds) of a full-length video comprises the first version of video scene (1) combined with the second version of card (2), and further combined with the third version of the overlay, and no music background music.

"Dropping" comprises making alternative versions (V) of the video script by deleting one or more video elements and/or segments.

Exemplifications of the Video Editor Device

One or more embodiments of the present disclosure provide a video editor computing device with the media-editing application of the present disclosure (e.g. the VideoAB™ Tool application 160 installed on, or accessible via a network 150). An exemplary graphical user interface (GUI) 300, or display, is illustrated in FIGS. 3 and 4, and comprises four windows, or sections: source files 310; video editing tools 320; video timeline 330; and video output 340.

Figure 2:
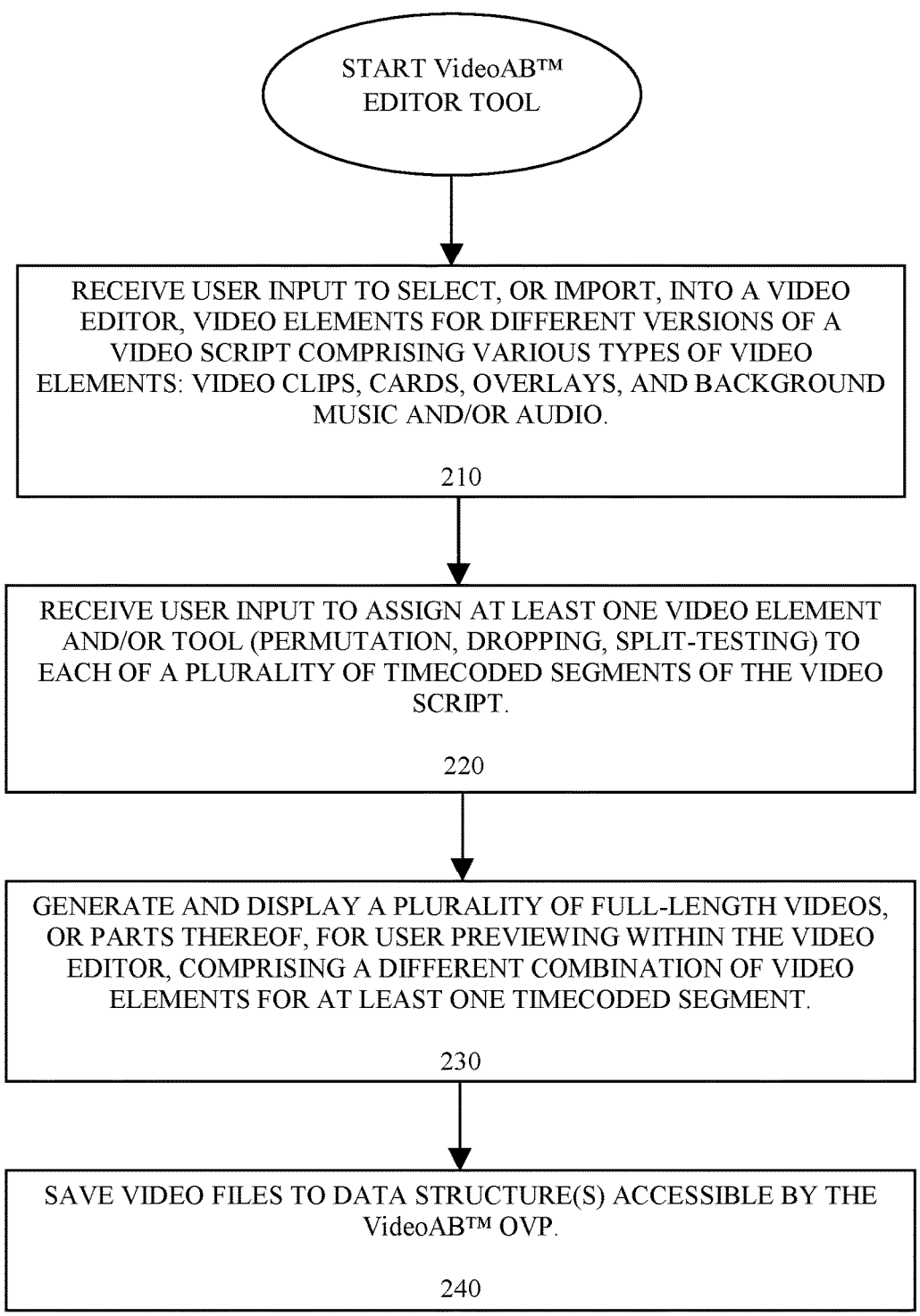
FIG. 2 is a flowchart of computer steps performed using the VideoAB™ Editor Tool comprising video editor functions, e.g. Permutations, Split-Testing, and Dropping, that are used to create different versions of a video script.
Figure 3:
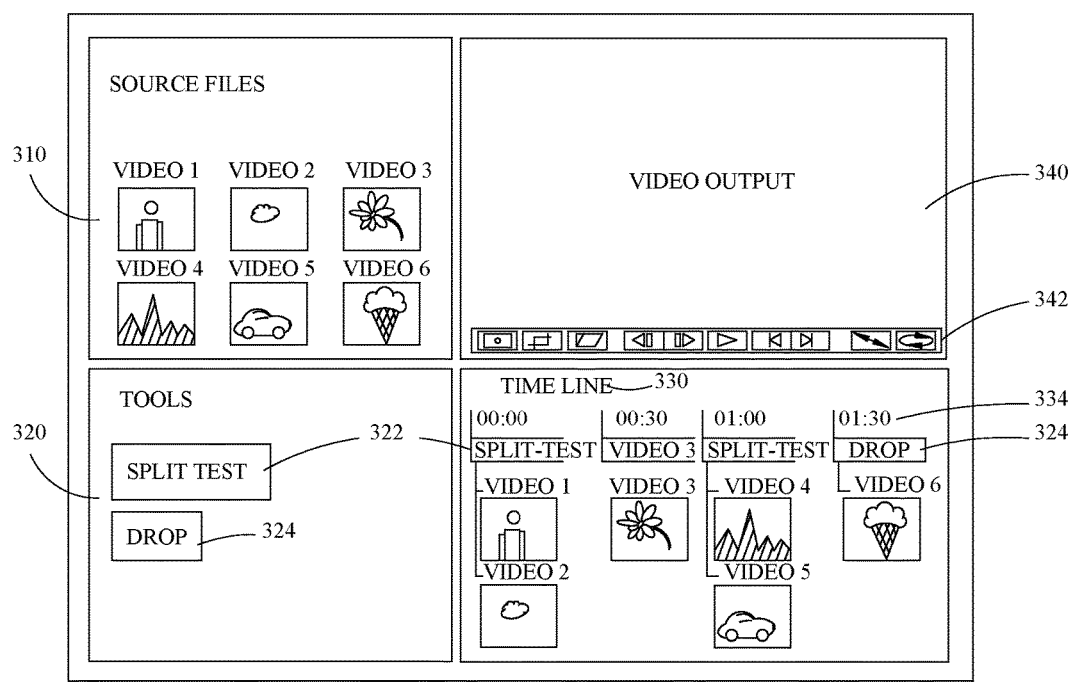
FIG. 3 is a screen shot of an exemplary VideoAB™ Editor Tool on a video editor device running the computer media of the present disclosure to allow a user to select the multiple variations in the video that the VideoAB™ OVP will generate and upload to various types of web browsers for market testing.
Figure 4:
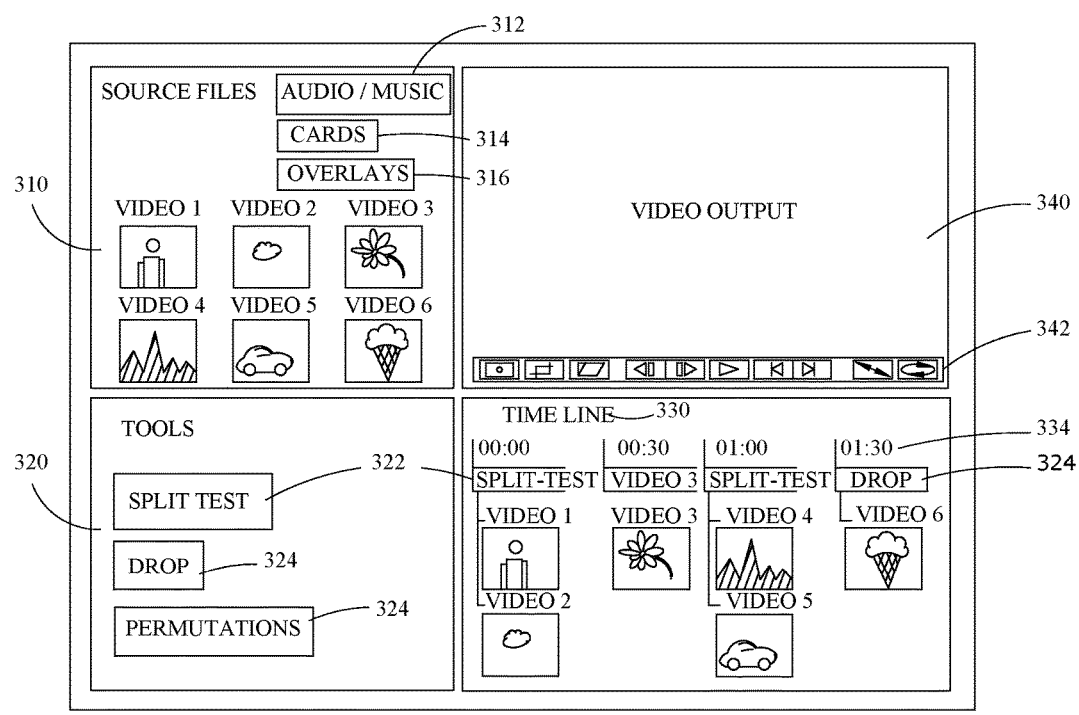
FIG. 4 is a screen shot of another exemplary VideoAB™ Editor Tool on a video editor comprising source files of: videos, audio voice and/or background music, cards, and overlays.

FIG. 2 is an illustration of the video editor device functions steps, as performed on the GUI 300 of FIGS. 3 and 4, although it is noted that these editorial steps need not all be performed, or performed in the order of FIG. 2. Nor do all of the steps need to be performed by the video editor device. For example, in an embodiment, the video editor device receives user input to split-test and drop functions to create multiple versions of the video segments that are saved to a data structure (memory), and the VideoAB™ online video platform (VideoAB™ OVP) of the present disclosure ingests the files within the data structure to permutate the video segments to randomly create full-length videos for distribution and market testing.

In another embodiment, as illustrated in FIG. 2 with the flowchart for steps performed by the computer 110 with the VideoAB™ Editor Tool 160, comprises: 1) receiving user input to select (e.g. dropping and dragging files) or import video elements for a video script, wherein there are different versions of each type of video element. In an embodiment, there are four types of video elements that comprise: video clips; cards; overlays; and background music and/or audio (step 210); 2) receiving user input to assign at least one video element and/or a tool (e.g. permutation, split-testing, and/or dropping) to each of a plurality of timecoded segments of the video script (step 220); 3) generating on displaying for previewing on the editor a plurality of full-length videos, or parts thereof, comprising a different combination of video elements for at least one timecoded segment (step 230); and 4) saving the video files into a data structure accessible by a video editor provider computer via a network connection, such as VideoAB™ OVP (step 240).

Per step 210, a digital video script and/or individual media files of the various video elements are uploaded (e.g. stored text files of cards and overlays) or imported (e.g. video clips from a digital camera) into the VideoAB™ editor tool of the present disclosure, and comprises multiple versions (V) of one or more of the video elements: scenes, cards, overlays, and/or music or voice over recordings. They are subsequently displayed in window 310 of FIGS. 3 and 4.

Per step 220, FIG. 2, and FIGS. 3, 4, the computer 110 receives user input to assign video elements to the time-coded segment from the source files window (FIG. 3, 4; 310), and from the tools window (320); onto the time bar 334.

Source files 310, also known herein as "events" or "scenes" or "video clips", are video segments or clips that the user has purchased, or downloaded, or filmed and imported into the editor device, such as from a digital camera. As illustrated in the exemplification of FIG. 3, six different videos are available for the user to edit and combine into a plurality of full-length video outputs; and in another embodiment as illustrated in FIG. 4, the source files may further comprise: audio voice overs or background music 312; cards 314; and overlays 316.

Furthermore, in step 220 the device receives user input for "Editor Tools" 320 for one or more timecoded segments, which comprise the types of video edits that are available for the user to select from, as per FIGS. 3 and 4: split-testing icon 322, dropping icon 324, and permutation icon 326. User selection means may comprise selecting and dragging the icons to the time bar 334, or other means, such as clicking on the tools opens another window or drop-down menu to receive user input for how to apply the tools to the source files at specified timecoded segments (see step 220).

In at least one embodiment, per FIG. 2, step 220, a permutation function is selected by the user of the tool, e.g. the "video editor", to input into the time coded segments of the video editor one or more different orders of the video elements. For example, in FIGS. 3 and 4, the video editor can permutate the video clips 1 and 6 by switching Video 6 into time code :00 to :30 seconds and Video 1 into the time code 1:30 to 2:00.

[Scene 1+Scene 2+Scene 3] is permutated to [Scene 2+Scene 1+Scene 3]

And in step 220, the video editor inputs the split-testing function to combine different video elements for one or more timecoded segments. For example, two versions of a timecoded segment comprise different scenes and/or cards and/or overlays and/or music (if any).

Segment (N)=Scenes (X)+Cards (Y)+Overlay (Z)+Background Music (Q)

Segment 1 (V1)=scene (1)+card (2)+overlay (3) and no music

Segment 1 (V2)=scene (1)+card (1)+overlay (2)+BM (1)

And in step 220, the video editor selects the dropping function to make alternative versions of the video script by deleting one or more video elements in a timecoded segment or the entire segment. For example, in one version, a timecoded segment comprises deleting the music and overlay; and in another version, only the card is deleted.

V1=Segment (2) dropped=deleting Music (2)+Overlay (2)

V2=Segment (2) dropped=deleting only card (2)

In one embodiment, only various versions of video clips are assembled into full-length videos by the editor (FIG. 3), and cards, audio-music and overlays are randomly added by the OVP 120 from separate media files saved on the data structure(s) 125. In another embodiment, video clips, cards, audio and background music, and/or overlays are assembled into various full-length videos by the editor (FIG. 4), and then delivered in random order by the OVP 120 to the viewer's computer 140. And in another embodiment, various video elements are designated by the editor for each time-coded segment, saved in a data structure(s), and then randomly arranged into full-length videos by the OVP 120 upon viewer demand. Other methods of combining the VideoAB™ Editor Tools and the OVP to generate a variety of full-length videos are obvious to, and within skill level of the artisan.

The video timeline 330 is broken in this exemplification into thirty seconds intervals (or timecodes or segments) designated on the time bar 334; but the user may select other time intervals as needed. The video editor receives the user's selection (e.g. via dragging and dropping the split-test icon 322, and/or the drop icon 324, and/or the permutation icon 326 into the timecode bar 334). The video editor also receives the user's selection for the source files 310 for each time code, comprising at least one of: videos; overlays; audio and/or background music; and cards. In this exemplification of FIGS. 3 and 4, one tool per segment is selected: split-test (timecode 1: 00-30 seconds; and timecode 3: 1 minute to 1 minute 30 seconds); and dropping at timecode 4: 1 minute 30 seconds to 2 minutes.

The video editor then receives user input for designating the video elements in the source files 310 to specific time codes per the video script instructions, which are dragged and dropped into the timeline bar under a selected segment: e.g. video 1 and 2 are dropped under the first split-test (timecode 1: 00-30 seconds); video 3 is dropped into the second timecode segment; video 4 and 5 are dropped into the third timecode; and video 6 is dropped into the fourth timecode. Thus, there are multiple possible versions of the full-length video: (2 videos under timecode 1)*(1 video under timecode 2)*(2 videos under timecode 3)*(1 video under timecode 4) equals four variations.

In step 230, the editor device generates and displays in the video output window 340 user selected full-length video, or parts (e.g. one or more timecoded segments). The user can preview the video using the video play bar 342, which comprises standard input buttons found on a video player, such as: play, repeat, fast forward, reverse, pause, save, etc. For example, the video editor may receive user input (e.g. via clicking on icons in window 330) selecting video 1, video 3, and video 5 to play a full-length video in window 340 with only these events. The user can then make changes to the video elements or tools assigned to the time line 330.

In step 240, the plurality of video files created by the VideoAB™ editor computer is stored in at least one data structure accessible via the network 150 by the VideoAB™ OVP of the present disclosure. The plurality of video files may be stored locally in a data structure(s) on the editor computer, and/or on another cloud data services provider, and/or on a media file delivery service provider (MFDSP), comprising at least one of: a third-party video content delivery network, a media streaming service provider, etc. as long as the VideoAB™ OVP has access to retrieve, modify, and store the video files. In an embodiment, the data structure is encoded using Extensible Markup Language XML.

Data Structure

In an embodiment, the data structure of the present invention comprises the following files: 1) a Master File; 2) multiple video-data files each comprising the video elements assigned by the editor to each time-coded segment, and in an MPEG, H.264, or other compatible file format; and 3) multiple music-audio files comprising background music and voiceovers in MP3, AAC, or other compatible file format.

For example, the Master File XML would be defined as shown in Table 3.

TABLE 3

```
<VideoAB>
  <Segments>
    (Some number of <video-segments>, <overlay-seg-
      ments>, and <card-segments> of the type split-test,
      no-test, drop-test, and permutation-test)
  </Segments>
  <background-musics>
  (Some number of <music-segments>, of the type split-
    test, no-test, drop-test, and permutation-test)
  </background-musics>
  <video-segments> contain 1, or multiple <video> ele-
    ments
  <overlay-segments> contain 1, or multiple <overlay>
    elements
  <card-segments> contain 1, or multiple <card> elements
  <music-segments> contain 1, or multiple <music> ele-
    ments
```

By way of exemplification, the commercial for selling a tool in Table 2 is coded to create different versions of the commercial. The data structure coded in XML may comprise: 1) for timecode 0 to 5 seconds, split-testing of two versions of a video clip showing a confused man or a confused woman; 2) for timecode 5 to 7 seconds, one version of a card with designations of colors, font, and location of text; 3) for timecode 7 to 10 seconds, split testing two versions of textual overlay; and 4) for timecode 0 to 15 seconds, split-testing two versions of background music. See FIG. 5 for exemplary XML code for (1)-(4) as stored in the data structure.

Additionally, FIGS. 7A-7D illustrate exemplary XML code stored within the data structure for the VideoAB™ OVP to randomly generate: different video segments by designating time codes (FIG. 7A); different cards (FIG. 7B); different overlays (FIG. 7C): and different background music (FIG. 7D).

VideoAB™ Online Video Platform (VideoAB™ OVP)

Figure 8:
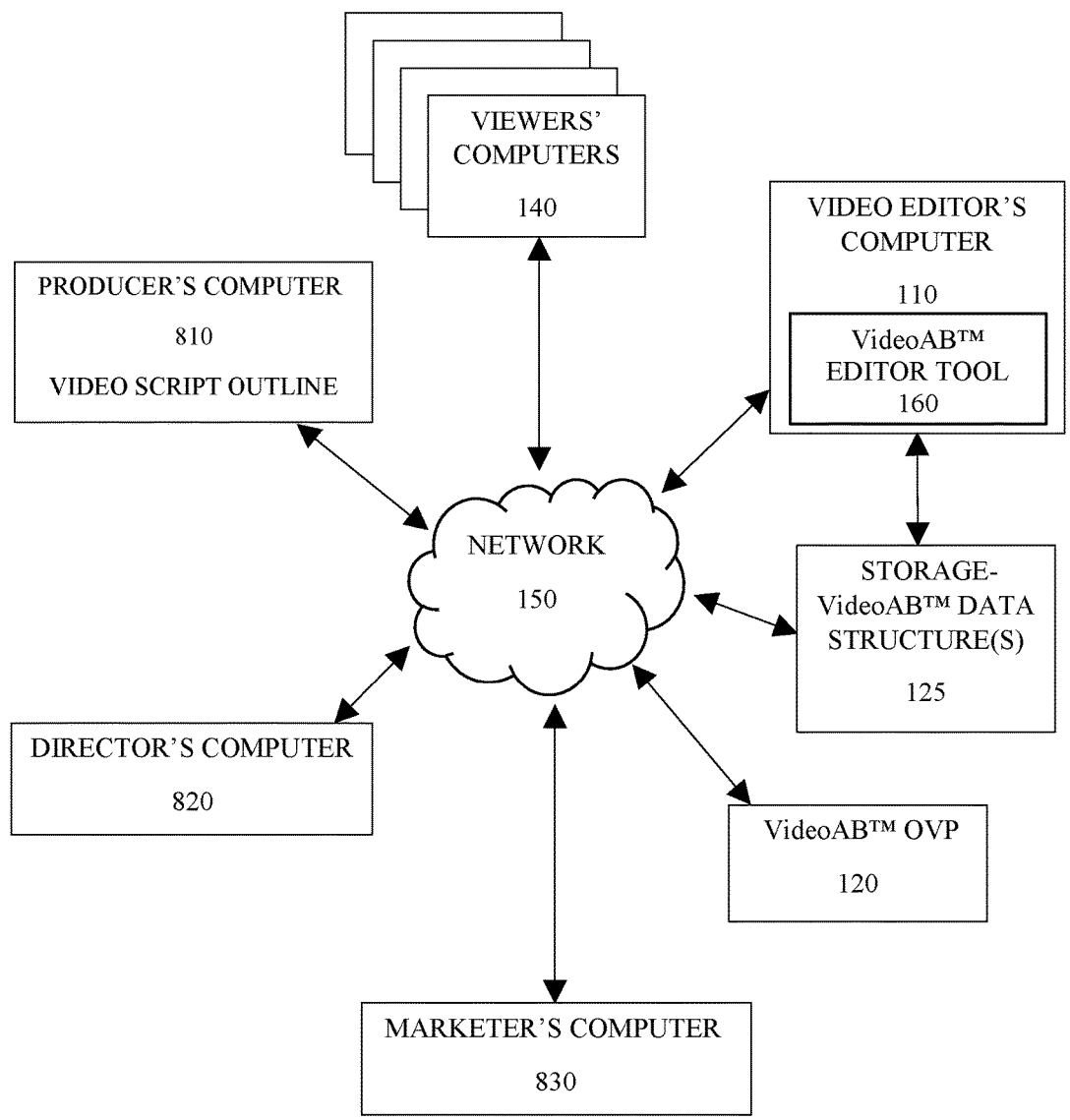
FIG. 8 is a block diagram of another embodiment of the networked computer system utilizing a producer's, editor's, director's and marketer's computers in conjunction with the VideoAB™ Editor Tool and VideoAB™ OVP.

The primary functions of the VideoAB™ Online Video Platform (OVP) 120 of FIGS. 1 and 8, of the present disclosure are: to randomly create multiple variations of full-length videos with the stored video elements for market testing in response to a visitor clicking on a webpage URL; and to deliver to, or enable the video to be viewed on the visitor's device. In another embodiment, the VideoAB™ OVP may further collect and analyze viewing data to determine a consensus of viewer likeability (e.g. favorite movie ending), or persuasiveness of the video (e.g. advertisement and will viewer be willing to purchase product, political campaign and will viewer vote for candidate or issue, etc.).

VideoAB™ OVP: The VideoAB™ OVP, and/or a content delivery network (CDN), of the present disclosure would randomly generate and deliver the plurality of the full-length video variations. The VideoAB™ Online Video Platform (OVP), or a third-party computer (e.g. marketer's, media file delivery service provider, a CHIMPS like service, etc.) would then automatedly conduct data gathering and statistical analysis to compute the user-viewer's feedback on the persuasiveness of the video to determine which video variation is most favored.

In an embodiment, the web browser on the first visitor-viewer-consumer's electronic computing device (e.g. smartphone, laptop, tablet, etc.), navigates to the HTTP server via the network, wherein it receives HTML code for the first full-length video; and is then redirected to the VideoAB™ OVP of the present disclosure. In response, the VideoAB™ OVP randomly generates a full-length video from stored video element files within the the data structure; and then downloads or streams the video to the visitor's device.

Data collection and statistical analysis would simultaneously occur for all viewer devices to determine which video variation is found the most favorable by the majority of viewers, and/or by a specific group of viewers (e.g. demographics, gender, age, location, income, etc.).

Figure 6:
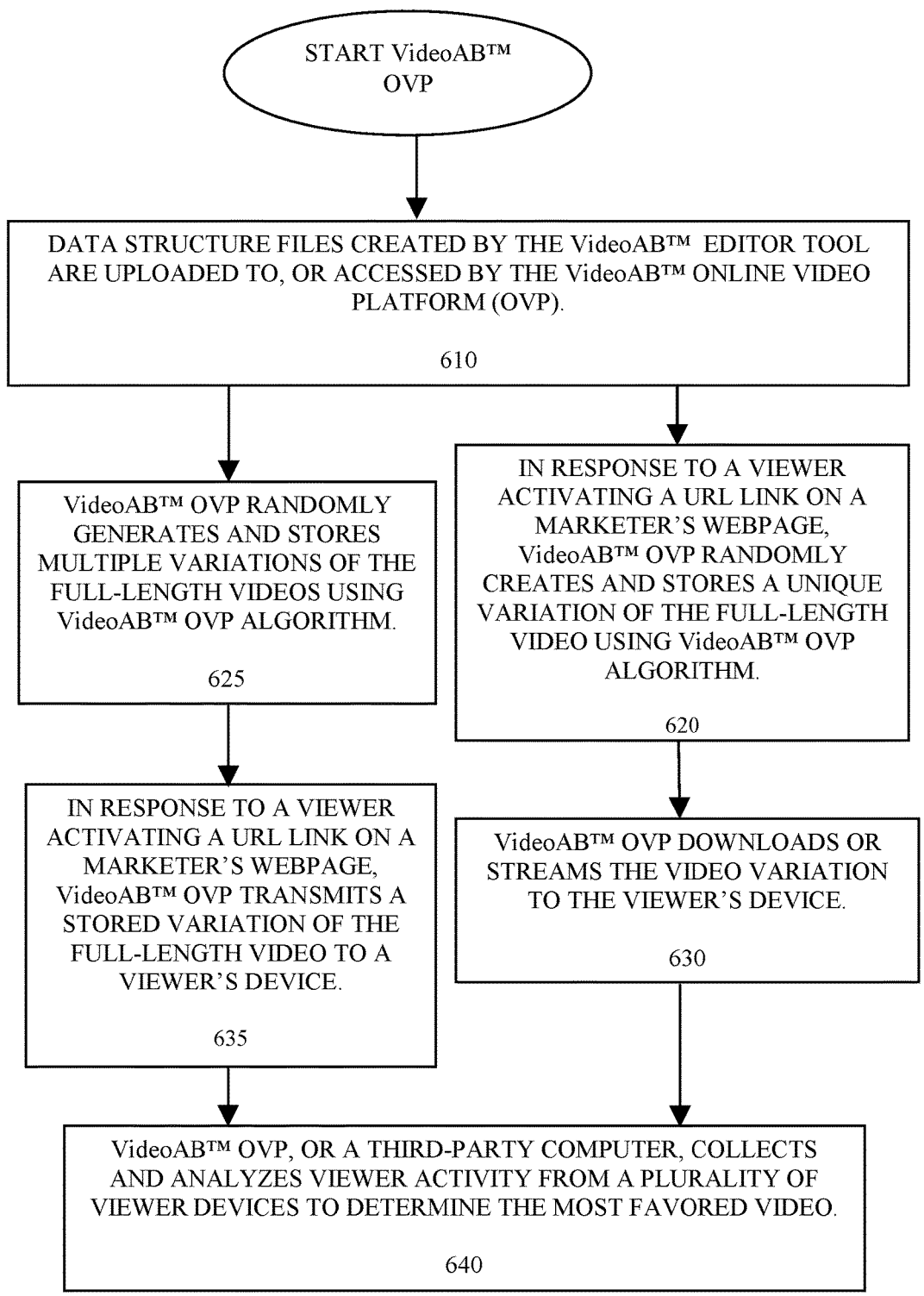
FIG. 6 is a flowchart of computer steps performed using the VideoAB™ OVP to randomly generate from the data structure a plurality of full-length video variations that are distributed for playback on a plurality of viewer's computing device.

FIG. 6 is a flowchart of steps performed in two exemplary embodiments by the VideoAB™ OVP (FIGS. 1 and 8, 120), although it is noted that these steps need not necessarily be performed in this ordered, and/or some may be performed concurrently.

In step 610, the plurality of video files created and stored in a content owner's account on the VideoAB™ Tool editor computer in an account data structure, are accessed, retrieved (ingested) or uploaded by content owner to the VideoAB™ Online Video Platform (OVP), which may be a local, a remote, or a cloud-based server. Alternatively, the VideoAB™ OVP may automatically access the data structure, such as in response to a visitor clicking on a webpage embedded URL link. The data structure comprises the plurality of video files generated and saved by the video editor per FIG. 3 and/or FIG. 4.

In the embodiment of steps 620 and 630, each new video variation is randomly created when a new viewer to a webpage clicks on the marketer's URL link. Specifically, in step 620, in response to receiving input from a viewer activating a URL link on a marketer's webpage, VideoAB™ OVP randomly creates and stores a unique variation of the full-length video using VideoAB™ OVP Algorithm. Then in step 630, the VideoAB™ OVP transmits the unique video to the viewer's device via the network 150, e.g. downloading or streaming it.

In an alternative embodiment comprising pre-storage of videos, in step 625, the VideoAB™ OVP creates multiple variations of the full-length video from the stored video files. In an embodiment, the video variations are randomly created by substituting the saved editor's selection of content for each timecode: video images, music, cards, audio, overlays, etc. See FIGS. 7A-7D for exemplary XML code of the VideoAB™ OVP Algorithm. And the different variations are stored on the VideoAB™ OVP, or other storage device accessible to it.

Then in step 635, in response to a viewer activating a URL link on a marketer's webpage, the VideoAB™ OVP transmits a stored variation of the full-length video to a viewer's device.

In either embodiment (pre-generation and storage, versus immediate generation and release), the total number of full-length videos that can possibly be generated is a function of multiplying the factorial number of the total number of elements permutated by the total number of each type of element. In an exemplification, 72 full-length video variations are produced by the VideoAB™ OVP from a permutation function of 2! (=2*1) times 3 scene variations (A1-A3) times 3 card variations (B1-B3) times 2 overlay variations (D1, D2) times 2 background music variations (M1, M2).

Mass distribution: In another embodiment (not shown in FIG. 6), the content owner file comprising the data structure with the video variations and elements is transmitted by the VideoAB™ OVP 120 to a media distributor 130, such as a file delivery service provider (MFDSP) for replication and mass distribution. Media distributors 130 comprises at least one of: a media file delivery service provider (MFDSP), such as a content delivery network; a media streaming service provider; a cloud data services provider; or other third-party media file delivery service provider. Additionally, or alternatively, the OVP 120 may also be adapted to directly distribute the full-length video files.

OVP 120 and/or media distributors 130 can further manage the processing and syndication of the full-length videos generated by the OVP 120. For example, the OVP 120 and/or media distributors 130 can provide transcoding and other services to enable media provided by the media provider(s) to be distributed in a variety of formats to a variety of different device types of viewer computers in a variety of locations. The transcoding ensures quality viewing for each type of video file format, network bandwidth and speed, etc. And the indexing facilitates data collection and analysis on viewer response to each video variation. Transcoding further enables the full-length video variations to be electronically transmitted in a variety of file formats to a variety of different user device types located in different geographic areas. Methods of transcoding video content are well known in the art. For example, the videos may be transcoded at least twice based on two profiles in order to produce a high-quality viewing experience: critical media files are transcoded and transmitted first, and then the remaining video files are transcoded and transmitted. Individual video elements may also have been previously transcoded by the video editor before storing in the original data structure, and may be further transcoded when merged into a full-length video.

Embodiments herein may utilize full-length files explicitly, other embodiments may utilize other forms of media assets, such as live streams, or other forms of media, such as dynamic web pages, and may incorporate multiple media elements, including players, user interface components, user controls and control components, images, and other media content, objects, or types.

Additionally, it can be noted that various functions, operations, processes, or other aspects that OVP 120 or media distributor 130 of FIG. 1 perform, can instead be performed by another system operating in conjunction with the 120 or 130, loosely or tightly synchronized with the 120 or 130, or independently. For example, collecting data from other digital services to be combined and reported with data collected by the 120 or 130 can, in some implementations, be performed by a system other than the 120 or 130.

In an embodiment of step 620 or 635, the VideoAB™ OVP, or media distributor, transmits via the network a URL link to the content owner's computer that is embedded (manually via a notification email, or automatedly) into the content owner's webpage. The URL link enables JavaScript, iFrame, and/or HTML tags that link via the network to the content owner's account on the VideoAB™ OVP. Thus, in response to a viewer-webpage visitor clicking on the URL link, the VideoAB™ OVP, or media distributor, will electronically transmit via the network a plurality a full-length video variation to the visitor's electronic computing device.

In the embodiment of steps 620 and 630, the full-length video variations are created, transcoded, indexed and electronically transmitted only after a user visits the content owners' webpage and clicks on the VideoAB™ OVP embedded URL link.

In the embodiment of steps 625 and 635, the full-length video variations are previously created, transcoded, indexed, and stored, so that a viewer device is retrieving each full-length video variation from storage on the VideoAB™ OVP 120, or the mass distributor's computer 130.

In step 640, the VideoAB™ OVP, or a third-party computer (MFDSP, CDP, Marketer's, etc.) collects and analyzes viewer activity from a plurality of viewer devices to determine the most favored or persuasive video for either embodiments Statistical Analysis of Viewer Activity:

In an embodiment of FIG. 6, step 640, the VideoAB™ OVP of the present disclosure computes metrics data of the full-length video variations that are viewed by each user device for a content owner (e.g. advertiser's) account, such as: data indicating how long the video was viewed, which may include a timestamp indicating at what video timecoded segment the viewer decided to cease viewing. And data may also include other viewer activity, such as if the viewer followed a link to buy the product when the video is an advertisement; as well as demographic user data (e.g. age, gender, income level, education level, geographic location, etc.).

In addition to metrics data collection on each viewer's activity, the VideoAB™ OVP, or other computer processor receiving the metrics data, can determine which video of the full-lengths videos in a content owner account is most favored or persuasive via conducting statistical analysis of the data collected remotely on the plurality of viewer devices, wherein each device displayed a different, randomly generated full-length video variation.

Additional methods of market testing of video content are well known in the art. In an exemplary embodiment of A/B testing of advertising, analytics are used to determine the video advertisement's ability to persuade a consumer to buy the product or service, which can be broken down by demographic sectors. In another exemplary embodiment for the entertainment industry, the analytics are used to determine which actors, characters, endings, storylines, etc. are most favored by a viewing audience for a television, movie, or video of a play. For example, online videos can be analyzed for favorability via: how long a visitor stays on a video's webpage; overall traffic volume; number of referrals from social media websites; comments posted on or about the video; how the time of day and day of week affect which videos are most favored; and responses to a questionnaire after viewing the video—"Would you buy this product?", "Which version of the movie ending did you prefer?", "Would you vote for this political candidate?", etc.

Third party analytics may also be used with the videos of the present disclosure. For example, Google Analytics® can be linked to the website hosting the video to capture data indicating: traffic volume and viewer geographic location; if a viewer follows the video link to buy the advertised product/service and/or actually buys online; etc.

Exemplifications

Previously in the prior art, a producer initiates the creation of a video, such as a marketer who is trying to convince customers to purchase the marketer's company's products and services. The producer decides on one or more business objectives for the video; and based on this, will develop a script that outlines the video elements, comprising: scenes, cards, overlays, and background music.

A director will then film the scenes, or purchase stock images and/or stock videos; and s/he will purchase music or hire a musician to compose and record music. A video editor, who is using a tool such as Final Cut Pro™ or Avid™, will take the filmed scenes with a plurality of video elements (e.g. audio, music, etc.) and create a single video file, typically in a format such as MPEG-2. The video editor then delivers the video file to the producer. The producer then places the video for exhibition on platforms, such as a marketer's company's website, and by ingesting the video into an Online Video Provider (OVP), e.g. Brightcove™. And then a third-party server measures the performance of the video, e.g. number of click-throughs, or other means appropriate for the platform.

The primary problem of this method arises if the marketer would like to try multiple versions of the video, then s/he would have to write multiple versions of the script, from which the editor would create multiple videos, and the marketer would need to place the multiple video files with the platforms for market feedback. Contrarily, the present disclosure enables the automated creation of multiple video versions for distribution to a plurality of viewer devices (e.g. one video version per device, and/or per visit of the same device to the same webpage), and automated data collection and analysis of viewer activity to determine the video version most favored.

In an exemplary embodiment, as illustrated in FIG. 8, the present disclosure comprises the computer system is a networked system comprising: a) a producer's electronic computing device 810 having installed thereon non-transitory computer-readable medium encoded with executable instructions for designating segmented timecodes of a video, and video element variations for a VideoAB™ Script; b) a director's electronic computing device 820 able to create a script variation for each timecoded segment; c) a video editor's electronic computing device 110 having installed thereon non-transitory computer-readable medium encoded with VideoAB™ Tool executable instructions for matching video elements to timecoded segments, and storing video variations of each video segments in a separate file; d) a marketer's electronic computing device 830 having installed thereon non-transitory computer-readable medium encoded with executable instructions for randomly creating and displaying video script variations; e) the VideoAB™ Online Video Platform 120 to generate and distribute the plurality of videos; f) a plurality of viewer electronic computing devices 140; and g) a wireless network 150 connecting (a) thru (f).

Figure 9:
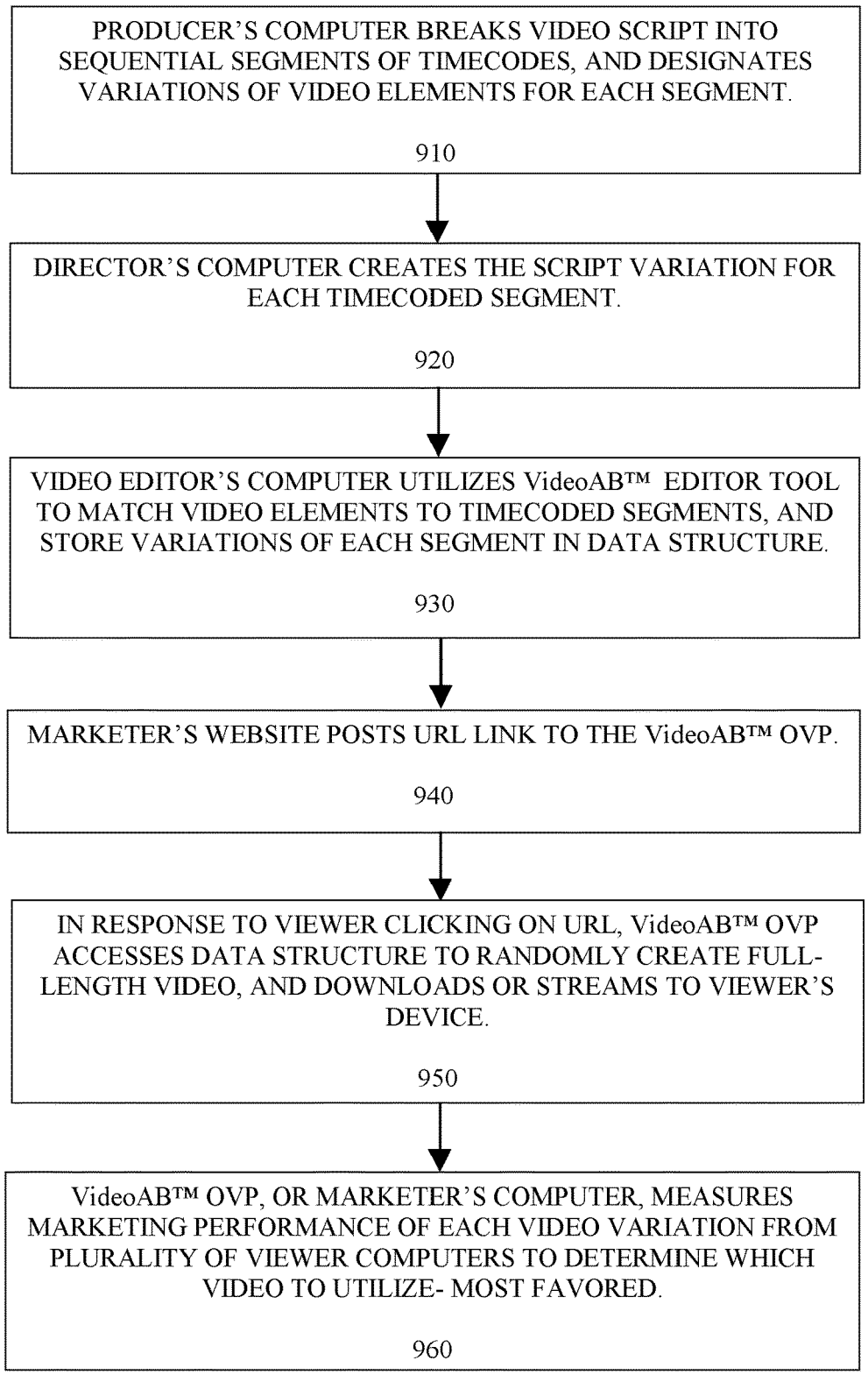
FIG. 9 is a general flowchart of computer steps performed by the system of FIG. 8 in automatedly generating and A/B market testing multiple versions of full-length videos, and statistical analysis of viewer activity.

FIG. 9 is a flowchart of computer steps performed via the system of FIG. 6. In step 910, the producer's computer 810 breaks a video script into sequential segments of timecodes that may vary in duration (minutes, seconds); and receives user input from the producer that designates variations in video elements for each timecode.

In step 920, the director's computer 820 creates the script variations for each timecoded segment by assigning the appropriate video elements to each timecode.

In step 930, the video editor's computer 110 having installed thereon the VideoAB™ Editor Tool 160 designates the producer-director's designated variations of video elements (e.g. video clip, card, background music and overlay) for each timecode by dropping and dragging onto the timeline of FIG. 3 or 4. The video files are then saved in a data structure accessible via at least the VideoAB™ OVP, and as an MPEG2, MPEG4, H264, MP3, AAC, or other file format applicable to the type of data.

In step 940, the producer's computer 810 uploads the videos, or makes them accessible via a URL link on the marketer's website.

In step 950, the VideoAB™ OVP 120 randomly generates a plurality of full-length videos from the data structure that are displayed on the viewer's computer 140. When a viewer's computer 140 receives a viewer input of clicking on a video in a browser generated by the VideoAB™ OVP 120, then a video player that is embedded in the web page plays the video variation from the right in the webpage. And for smaller form factor devices like iPhones®, then a separate video player is automatedly launched to play the video variation.

In step 960, the VideoAB™ OVP 120, or another computer (e.g. marketer's computer 830), collects viewers' data and conducts statistical analysis to determine the most favored video by a plurality of viewers.

Computer Structures

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

As used herein, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
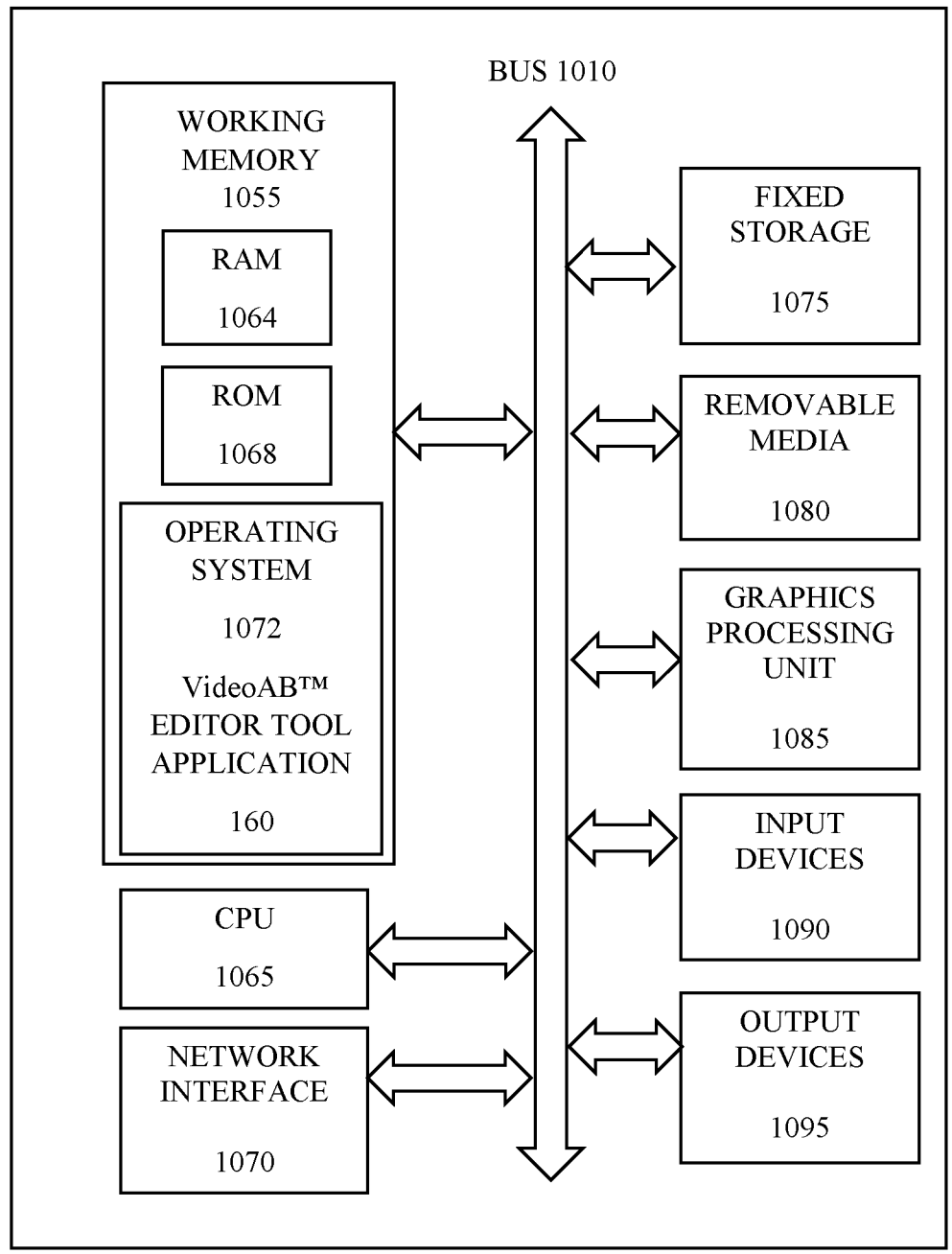
FIG. 10 is a schematic diagram of the computer systems of FIGS. 1 and 8.

FIG. 10 conceptually illustrates a computer system 1000 with which some embodiments of the disclosure are implemented, e.g. FIG. 1 or 8. The computer system 1000 may be a computer (e.g., a desktop computer, personal computer, tablet computer, gaming console, smart television, smartphone, PDA, etc.), or any other sort of electronic or computing device. Such an electronic system includes various types of computer readable media and interfaces for various other types of computer readable media. Electronic system 1000 includes a bus 1010, central processing unit(s) (CPU's) 1065, a graphics processing unit (GPU) 1085, a working memory 1055, an operating system 1072, random access memory 1064, a read-only memory 1068, a permanent storage device 1075, a network interface 1070, input devices 1090, and output devices 1095. The bus 1010 collectively represents all system, peripheral, and chipset buses that communicatively connect the numerous internal devices of the computer system 1000.

From these various memory units, the central processing unit(s) 1065 retrieves instructions to execute and data to process in order to execute the processes of the disclosure. The processing unit(s) may be a single processor or a multi-core processor in different embodiments. Some instructions are passed to and executed by the GPU 1085. The GPU 1085 can offload various computations or complement the image processing provided by the processing unit(s) 1065.

In many embodiments, the computer system 1000 will further comprise a working memory 1055, which can include a RAM 1064 or ROM 1068 device, as described above. Software elements, shown as being located within the working memory 1055, can include an operating system 1072, device drivers, executable libraries, and/or other code, such as one or more VideoAB™ Editor Tool application programs 160, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 2-9, might be implemented as code and/or instructions executable by a computer (and/or a processing unit within a computer); in an aspect, then, such code and/or instructions can be used to configure and/or adapt a general purpose computer, processing unit, and/or other device to perform one or more operations in accordance with the described methods.

A set of these instructions and/or code might be stored on a non-transitory computer-readable storage medium, such as the storage device(s) 1075 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to central processing unit(s) 1065 executing one or more sequences of one or more instructions (which might be incorporated into the operating system 1072 and/or other code, such as an application program 160) contained in the working memory 1055. Such instructions may be read into the working memory 1055 from another computer-readable medium, such as one or more of the storage device(s) 1075. Merely by way of example, execution of the sequences of instructions contained in the working memory 1055 might cause the central processing unit(s) 1065 to perform one or more procedures of the methods described herein. Additionally or alternatively, portions of the methods described herein may be executed through specialized hardware.

The bus 1010 also connects to the input devices 1090 and output devices 1095. The input devices 1090 enable the user to communicate information and select commands to the electronic system. The input devices 1090 include alphanumeric keyboards and pointing devices (also called "cursor control devices", or mouse), cameras (e.g., webcams, digital cameras), microphones or similar devices for receiving voice commands, etc. The output devices 1095 display images generated by the electronic system or otherwise output data. The output devices 1095 include printers and display devices, such as cathode ray tubes (CRT) or liquid crystal displays (LCD), as well as speakers or similar audio output devices. Some embodiments include devices such as a touchscreen that function as both input and output devices.

The computer system 1000 can also include a network interface 1070, which can include wireless and wired communication technologies. Accordingly, the communications interface can include a modem, a network card (wireless or wired), an infrared communication device, a wireless communication device, and/or a chipset (such as a Bluetooth™ device, an IEEE 602.11 device, an IEEE 602.15.4 device, a WiFi device, a WiMax device, cellular communication facilities, UWB interface, etc.), and/or the like. The network interface 1070 can therefore permit the computer system 1000 to be exchanged with other devices and components of a network 150.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

CONCLUSION

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology. For example, customized hardware might also be used, and/or particular elements might be implemented in hardware, software (including portable software, such as applets, etc.), or both. Further, connection to other computing devices such as network input/output devices may be employed.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A computer-implemented method for automatedly generating and market testing a plurality of full-length video variations, the method comprising:
   selecting video elements for a video script, wherein there are different versions of each type of video element, and said type of video elements comprise: video clips; cards; overlays; and background music and/or background audio;
   assigning at least one video element to each of a plurality of timecoded segments of the video script, via implementation of a video editor computer tool, wherein said assigning comprises said tool,
   1) uploading files comprising different versions of at least one type of video element;
   2) receiving a user request to: assign the different versions to a video script divided into timecoded segments, and a user request to permutate, drop, and/or split-test at least one video element in at least one timecoded segment;
   3) displaying in playback mode for a user to preview a user created full-length video, or timecoded segments thereof, and saving the video elements within separate video files within a data structure;
   automatedly, randomly generating a plurality of full-length videos, the full-length videos comprising a different random combination of video elements for at least one timecoded segment;
   distributing, via a network, a full-length video to each of a plurality of viewer electronic computing devices; and
   receiving viewing activity from the viewers' devices, via the network, for the plurality of full-length videos to identify a viewers' preferred full-length video from the plurality of videos.

2. The computer-implemented method of claim 1, wherein the stored video files within the data structure are separated into files by video element type, and/or by timecoded segments comprising user assigned video elements, and at least one tool to permutate, drop, or split-test the video elements.

3. The computer-implemented method of claim 2, wherein in response to a viewer clicking on a webpage or mobile application comprising a URL link, the online video platform randomly generates a full-length video from the different versions of each timecoded segment stored in the data structure, and transmits the full-length video via the network to the viewer's device.

4. The computer-implemented method of claim 2, wherein the online video platform randomly generates a plurality of full-length videos from the different versions of each timecoded segment stored in the data structure, and transmits one of the full-length videos to a viewer's device in response to the viewer clicking on a webpage, or mobile application, URL link.

5. The computer-implemented method of claim 3, wherein the URL link either directs a video player embedded within the webpage to the online video platform, or launches a native video player, which downloads or streams video from said platform.

6. The computer-implemented method of claim 4, wherein the URL link either directs a video player embedded within the webpage to the online video platform, or launches a native video player, which downloads or streams video from said platform.

7. The computer-implemented method of claim 1, wherein the full-length videos comprise alternative versions of at least one of: product and/or service commercials; scenes from television or movies; and political campaign and issue advertisements; and wherein identifying the preferred video comprises collecting viewer activity from the plurality of viewer devices, and determining via statistical analysis which video of the plurality of videos was most likely to persuade the viewers to act in a specific manner, and/or is most favored by the majority of the viewers.

8. A networked computer system for automatedly generating and market testing a plurality of full-length video variations, the system comprising:
   a wireless network connecting a plurality of viewer computers, a video editor computer, and/or an online video platform computer, wherein the computers comprise, one or more processors; and a memory coupled to the one or more processors and configured with executable instructions stored thereon, the instructions when executed causing the one or more processors to:
   select video elements for a video script, wherein there are different versions of each type of video element, and said type of video elements comprise: video clips; cards; overlays; and background music and/or background audio;
   assign at least one video element to each of a plurality of timecoded segments of the video script, via implementation of a video editor computer tool, wherein said assigning comprises said tool,
   1) uploading files comprising different versions of at least one type of video element;
   2) receiving a user request to: assign the different versions to a video script divided into timecoded segments, and a user request to permutate, drop, and/or split-test at least one video element in at least one timecoded segment;
   3) displaying in playback mode for a user to preview a user created full-length video, or timecoded segments thereof, and saving the video elements within a data structure, wherein the video files are separated into files by video element type, and/or by timecoded segments comprising user assigned video elements and tools of permutate, drop, and/or split-test;

automatedly, randomly generate a plurality of full-length videos comprising a different combination of video elements for at least one timecoded segment, wherein at least one video element is permutated, dropped, and/or split-tested in at least one timecoded segment;

distribute, via a network, a full-length video to each of a plurality of viewer computers; and receive viewing activity from the viewer computers, via the network, for the plurality of full-length videos to identify a viewers' preferred full-length video from the plurality of videos.

9. The networked computer system of claim 8, wherein in response to a viewer clicking on a webpage or mobile application comprising a URL link, the online video platform randomly generates a full-length video from the different versions of each timecoded segment stored in the data structure, and transmits the full-length video via the network to the viewer's device.

10. The networked computer system of claim 8, wherein the online video platform randomly generates and stores a plurality of full-length videos from the different versions of each timecoded segment stored in the data structure, and transmits one of the full-length videos to a viewer's device in response to the viewer clicking on a webpage, or mobile application, URL link.

11. The networked computer system of claim 9, wherein the URL link either directs a video player embedded within the webpage to the online video platform, or launches a native video player, which downloads or streams video from said platform.

12. The networked computer system of claim 10, wherein the URL link either directs a video player embedded within the webpage to the online video platform, or launches a native video player, which downloads or streams video from said platform.

13. The networked computer system of claim 8, wherein the full-length videos comprise alternative versions of at least one of: product and/or service commercials; scenes from television or movies; and political campaign and issue advertisements; and wherein identifying the preferred video comprises collecting viewer activity from the plurality of viewer devices, and determining via statistical analysis which video of the plurality of videos was most likely to persuade the viewers to act in a specific manner, and/or is most favored by the majority of the viewers.

14. A non-transitory computer-readable medium storing a media-editing application for execution by at least one processing unit, the media-editing application comprising sets of instructions for:

uploading files comprising different versions of at least one type of a video element, wherein said type of video elements comprise: video clips; cards; overlays; and background music and/or background audio;

receiving user input to assign at least one video element and/or tool to each of a plurality of timecoded segments of the video script, wherein the tools comprise permutation, dropping, and split-testing functionality of the video elements;

displaying in playback mode for a user to preview a user created full-length video, or timecoded segments thereof, and saving the video elements within separate video files within a data structure, wherein the video files are separated into files by video element type, and/or by timecoded segments comprising user assigned video elements and tools of permutate, drop, and/or split-test;

generating automatedly, randomly a plurality of full-length videos, or parts thereof, for previewing comprising a different combination of video elements for at least one timecoded segment; and saving the assigned video elements for each timecoded segment into at least one video file within a data structure that is accessible by an online video platform computer via a network connection.

15. The non-transitory computer-readable medium of claim 14, wherein in response to a viewer clicking on a webpage or mobile application comprising a URL link, the online video platform automatedly, randomly generates a full-length video from the different versions of each timecoded segment stored in the data structure, and transmits the full-length video via the network to the viewer's device.

16. The non-transitory computer-readable medium of claim 14, further comprising the online video platform identifying the preferred video by collecting viewer activity from the plurality of viewer devices, and determining via statistical analysis which video of the plurality of videos was most likely to persuade the viewers to act in a specific manner, and/or is most favored by the majority of the viewers.

* * * * *